United States Patent
Ranalli

(10) Patent No.: US 6,574,380 B2
(45) Date of Patent: Jun. 3, 2003

(54) TAPPED DELAY LINE-BASED CONFIGURABLE SPECTRAL FILTER WITH IN-SITU MONITORING

(75) Inventor: Eliseo R. Ranalli, Irvine, CA (US)

(73) Assignee: Corning Incorporated, Corning, NY (US)

( * ) Notice: Subject to any disclaimer, the term of this patent is extended or adjusted under 35 U.S.C. 154(b) by 54 days.

(21) Appl. No.: 10/016,014

(22) Filed: Nov. 2, 2001

(65) Prior Publication Data

US 2002/0106151 A1 Aug. 8, 2002

Related U.S. Application Data

(63) Continuation-in-part of application No. 09/902,424, filed on Jul. 10, 2001.

(30) Foreign Application Priority Data

Jul. 11, 2000 (EP) ............................................. 00401993

(51) Int. Cl.⁷ .............................. G02F 1/01; G02B 6/26
(52) U.S. Cl. ................................ 385/1; 385/27; 385/47
(58) Field of Search .............................. 385/1–10, 27, 385/39–42, 44–48

(56) References Cited

U.S. PATENT DOCUMENTS

| 4,840,447 A | 6/1989 | Kataoka |
| 5,253,309 A | 10/1993 | Nazarathy et al. |
| 5,347,601 A | 9/1994 | Ade et al. |

(List continued on next page.)

OTHER PUBLICATIONS

E. Ranalli and H.P. Lee, "A tapped delay line optical spectrum analyzer", Optics Communications, vol. 104, No. 1,2,3, pp. 13–17 (1993).

A. Ranalli, "Tapped delay line–based configurable spectral filter with in–situ monitoring", Technical Digest for Conference "Optical Amplifiers and Their Applications", Stresa, Italy, Jul. 1–4, 2001, OTuE15.

Habel, R. et al., "Optical domain performance monitoring", Optical Fiber Communication Conference. Technical Digest Postconference Edition. Trends in Optics and Photonics vol. 37, Part vol. 2, pp. 174–175, Mar. 7–10, 2000.

Parry, S.P. et al., "Dynamic gain equalisation of EDFAs with Fourier filters", Optical Amplifiers and Their Applications Conference, 1999 Technical Digest, pp. 161–164, 1999.

Ranalli, E. et al., "A tapped delay line optical spectrum analyzer", Optics Communications, vol. 104 (1993) pp. 13–17.

Yamada, Makoto et al., "Low–noise and gain–flattened $Er^{3+}$–doped tellurite fiber amplifier", Optical Amplifiers and Their Applications, 1998 Technical Digest, pp. 86–89, 1998.

Pan, Jin–Yi, "Fiber–Amplifier cascades with equalization employing M–Z optical filters in multiwavelength systems", Optical Amplifiers and Their Applications Conference, 1994, FA3, pp. 114–116.

*Primary Examiner*—Akm E. Ullah
*Assistant Examiner*—Michelle R. Connelly-Cushwa
(74) *Attorney, Agent, or Firm*—Walter M. Douglas

(57) ABSTRACT

A method of modifying the spectral distribution of an optical signal includes the steps of splitting the signal among a plurality of optical paths, delaying the propagation of the signal through one or more of the optical paths by a time duration which results in the desired spectral distribution when the signals at the output ends of each optical path are recombined, and then recombining those outputs. An apparatus for changing the spectral profile of an optical signal includes an input waveguide and a plurality of tapped delay lines. Each of the tapped delay lines has a delay element configurable to impart a predetermined delay to the signal propagating down the delay line. Couplers split an optical signal, propagating on the input waveguide, among the tapped delay lines. The delays imparted to the signals on each line are chosen so as to effect the desired change to the spectral profile. The device also provides for a monitoring mechanism by allowing partial transmission of the signal energy from the delay taps to a monitor to reveal information which can be used to enhance the filter instantaneous state.

17 Claims, 7 Drawing Sheets

U.S. PATENT DOCUMENTS

| | | |
|---|---|---|
| 5,351,317 A | 9/1994 | Weber |
| 5,832,155 A | 11/1998 | Rasch et al. |
| 6,275,328 B1 | 8/2001 | Parry et al. |
| 6,400,871 B1 * | 6/2002 | Minden ..................... 385/39 |
| 6,470,125 B1 * | 10/2002 | Nashimoto et al. ......... 385/122 |
| 6,487,336 B1 * | 11/2002 | Yao ............................. 385/24 |
| 6,501,872 B2 * | 12/2002 | Augustsson .................. 385/24 |
| 2002/0159686 A1 * | 10/2002 | Madsen ...................... 385/24 |
| 2002/0159698 A1 * | 10/2002 | Lin ............................. 385/39 |
| 2002/0159701 A1 * | 10/2002 | Katayama et al. ............ 385/39 |

* cited by examiner

TAPPED DELAY LINE-BASED CONFIGURABLE SPECTRAL FILTER WITH IN-SITU MONITORING

RELATED APPLICATION

This application is a Continuation-in-Part of U.S. patent application Ser. No. 09/902,424, filed Jul. 10, 2001, titled TAPPED DELAY LINE BASED GAIN FLATTENING FILTER, incorporated herein in its entirety by reference, which claims priority to European Patent Application No. 00401993.1, filed Jul. 11, 2000.

FIELD OF THE INVENTION

The present invention relates generally to optical fibers, and in particular to a device which provides a monitoring mechanism by using partial transmissions from the taps in a tapped delay line filter to provide enhancement of the filter's performance in real-time operation.

BACKGROUND OF THE INVENTION

Actively configurable optical filters have many potential applications in optical communications, such as temporal pulse compression, dispersion slope compensation and spectral shaping. Spectral shaping is of particular interest in connection with optical amplifiers. The gain profile of a typical optical amplifier may be affected by numerous factors such as, for example, fiber length, fiber composition, splice losses, as well as the population inversion level of the dopant atoms (e.g. erbium) providing the gain. Having a relatively large optical signal at the input of the amplifier tends to deplete the excited electron population, resulting in a different spectral gain profile than that for a small input signal. Average gain also varies with input signal power.

One approach to dealing with this effect is to operate the amplifier at a constant population inversion, with a fixed spectral filter that provides gain flattening over the operating wavelength range. In this approach, the inversion level is held fixed by selectively attenuating the input signal until the desired inversion level is achieved. However, there may be circumstances where operating the amplifier at a constant gain level, rather than a constant inversion level, would be advantageous. By utilizing an actively configurable spectral filter, an amplifier could be used in a constant-gain mode, rather than constant inversion level, by flattening the gain profile of the amplifier for arbitrary inversion levels. One approach for realizing such a configurable spectral filter is to spatially disperse the various wavelength components of the input signal via a diffraction grating, then spatially modulate the dispersed components via a spatial light modulator or acoustically-formed phase grating. The polarization dependence and diffractive losses of the grating could be a drawback in some applications, however. Prisms could be used instead of a diffraction grating to eliminate polarization dependence and to decrease angular dispersion. However, prisms require an increase in package size, which makes their use undesirable in many applications.

In "Planar Tapped Delay Line Based, Actively Configurable Gain-Flattening Filter", Proceedings of the 26$^{th}$ European Conference on Optical Communication, Vol. 3, pages 21–22 (2000), A. Ranalli and B. Fondeur have shown that the filters of the title, when configured using thermo-optic perturbation of the index of refraction in silica channel waveguides, are suitable for applications requiring spectrally slow optical transfer functions. A finite impulse response ("FIR") version of the filter achieves a desired optical transfer function ("OTF") by splitting the input signal into several taps, delaying each by a sampling interval with respect to its neighbor tap, imparting a nearly wavelength-independent phase shift to each tap, and then recombining the delayed components in the same ratios into which they were split. As a result of such procedures, a given filter configuration can be characterized by specifying each tap's power split ratio and delay perturbation, or equivalently, its phase.

In an ideal situation, the desired filter state can be achieved in an "open-loop" manner; for example, by calibrating splitter structures and phase-shifters, and then relying on the calibration data to reproduce any arbitrary state. However, if one wishes to monitor the output spectrum, or if the calibration data is not sufficiently reliable to perform as a valid indicator of the state of the device, then external monitoring must be provided.

SUMMARY OF THE INVENTION

One aspect of the invention is an apparatus for changing the spectral profile of an optical signal that includes a plurality of optical paths, each being associated with a delay element which imparts a predetermined delay to a signal propagating through the optical path. A plurality of couplers is configured to split the optical signal among the plurality of optical paths according to a predetermined splitting ratio. The predetermined delays and predetermined splitting ratios are chosen so as to effect the desired change to the spectral profile.

In another aspect, the delay elements may include portions of the waveguide that have an altered index of refraction. The index of refraction may, in yet another aspect, be reversibly alterable.

In another aspect, the invention includes a method for modifying the spectral distribution of an optical signal which includes the steps of splitting the signal among a plurality of optical paths, each having an output end, so that a portion of the signal propagates on each of the optical paths; changing the relative phases of the portions of the signal propagating through the optical paths; modifying the amplitudes of the portions of the signal propagating through the optical paths; and combining the portions of the signal at the output ends of the optical paths. The relative phase changes and the amplitude modifications have magnitudes that result in a desired spectral distribution when the portions of the signal at the output ends of the optical paths are combined.

In another aspect, the invention includes a method for modifying the spectral distribution of an optical signal which includes the steps of splitting the signal among a plurality of optical paths according to predetermined splitting ratios, and changing the relative phases of the portions of the signal propagating through different ones of the optical paths; the relative phase changes and the splitting ratios having values which result in a desired spectral distribution when the portions of the signal at the output ends of the optical paths are combined; and combining the portions of the signal at the output ends of the optical paths.

In another aspect, the invention includes an optical communication system comprising an optical amplifier and a spectral filter that includes an input waveguide and a plurality of tapped delay lines. Each of the tapped delay lines has a delay element configurable to impart a predetermined delay to the signal propagating down the delay line. Couplers split an optical signal, propagating on the input waveguide, among the tapped delay lines. The delays imparted to the signals on each line are chosen so as to effect the desired change to the spectral profile.

In another aspect, the invention is directed to providing a monitoring mechanism by using partial transmissions from the taps themselves as a tapped delay line, diffractive array. The time-averaged diffractive pattern from the taps can then reveal information that can then be used to enhance the estimate of the filter's instantaneous state.

The claimed embodiments of the invention provide spectral shaping which is polarization-independent, and which, in certain embodiments, may be actively configurable or permanently configured. The spectral filtering of the invention may, if desired, be provided in a planar device, which is compact, reliable and economically fabricated. It is particularly well suited to use as a gain-flattening filter for an optical amplifier, which allows the amplifier to be used in a constant gain mode. Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention. Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
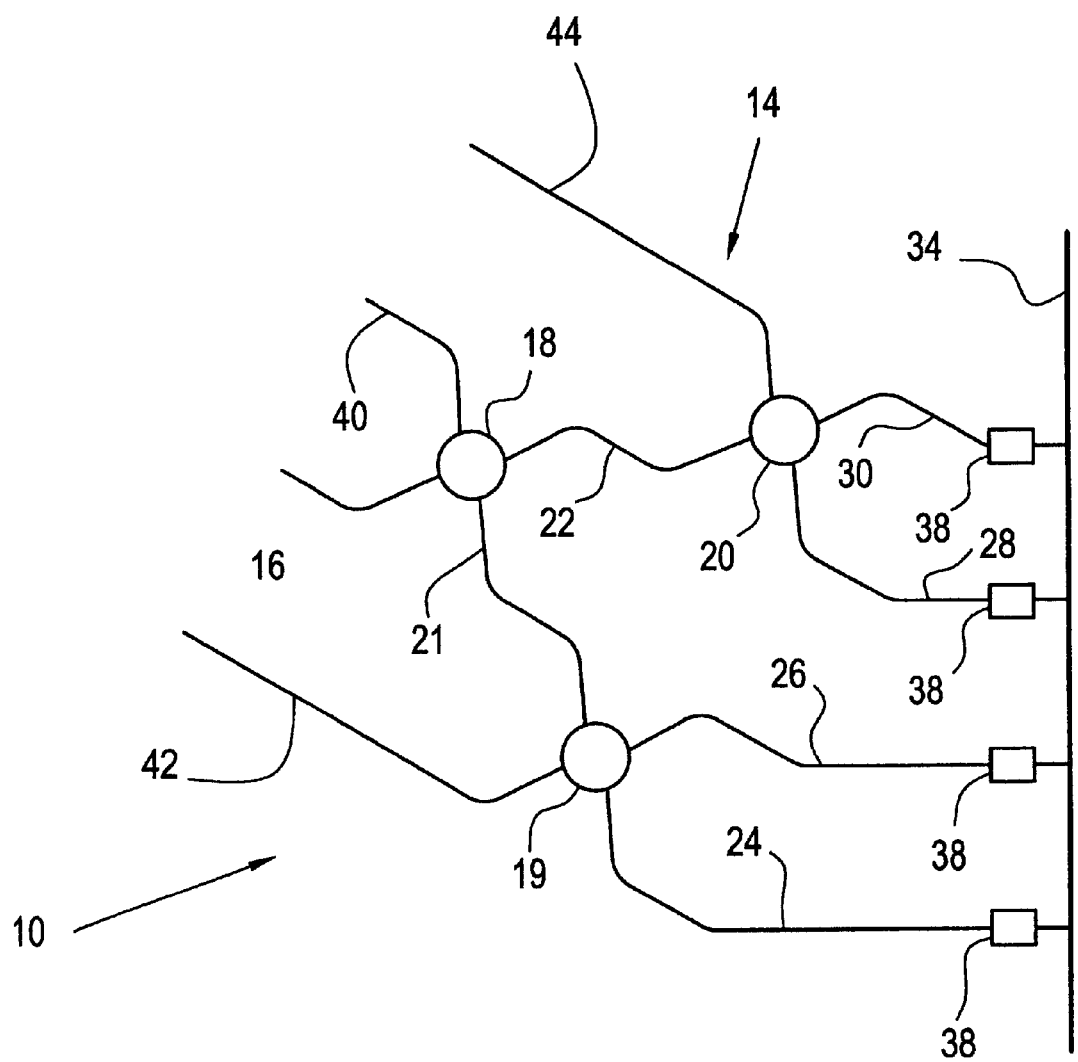
FIG. 1 is a schematic diagram of an embodiment of the invention.

Description of Tapped Delay Line Based Gain Flattening Filter

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of an apparatus for changing the spectral profile of an optical system of the present invention is shown in FIG. 1, and is designated generally throughout by reference numeral 10.

In accordance with the invention, an embodiment of the invention provides spectral shaping by employing an optical tapped delay line realization of the desired narrow-band impulse response. In this embodiment, a splitter tree partitions the incoming signal among several taps in the correct proportions for a given impulse response. Each tap imparts a nominal delay of T seconds, relative to neighboring taps. The design of the splitter tree may be chosen so that the inverse of the delay (1/T) is on the order of the free spectral range of interest, or more preferably, about twice the desired free spectral range. Delay perturbations in each tap set the approximate phase for that tap. With the splitter ratio determining amplitude, and the delay perturbations determining phase for the signal propagating down each tap, the signals output from each tap are superimposed to yield an output signal having the desired spectral shape.

As illustrated in FIG. 1, an embodiment of the present invention for changing the spectral profile of an optical signal includes an array of optical paths 14 which, in the illustrated embodiment, are configured in a splitter tree arrangement. The optical path array 14 can be an array of waveguides in a planar substrate, such as, for example, single mode silica waveguides on a silicon substrate, or waveguides on a $LiNiO_3$ substrate. In the illustrated splitter tree arrangement, a first optical path 16 directs the signal to a first coupler 18, which may be, for example, a Mach-Zehnder interferometer or other suitable variable coupler so that the coupling ratio may be selectively configured as desired. The first coupler 18 splits the signal into two portions and couples the two portions into optical paths 21, 22, each of which is optically connected to one of a second and a third coupler 19, 20 respectively, which may be any suitable variable 2×2 coupler such as a Mach-Zehnder interferometer. Each of the second and third couplers 19, 20 split the power input to it on to a pair of waveguides 24, 26 and 28, 30, respectively. In the illustrated embodiment, these waveguides act as taps, with the relative tap weights being effectively set by splitting the input power in appropriate ratios over the two stages of variable couplers made up by the first coupler 18 (in the first stage) and the second and third couplers (in the second stage). Each of the tap waveguides 24, 26, 28 and 30 has a different effective optical path length chosen so that each tap imports a nominal delay T to a signal propagating through it, relative to a neighboring tap. As illustrated, this may be accomplished by the tap waveguides having successively longer (or shorter) actual lengths. For purposes of illustration, a two-stage splitter tree is illustrated in FIG. 1. Embodiments with different numbers of stages and of tap waveguides are within the scope of the invention.

A delay element 38 is associated with each of the tap waveguides 24, 26, 28 and 30 for imparting delay perturbations to the signal traveling through that tap. The delay elements 38 may be, for example, portions of the associated waveguide which have an altered index of refraction. Altering the index of refraction in a waveguide changes the effective optical path length through that waveguide, thereby effecting a delay in propagation time, and in phase, through that waveguide. The alteration in refractive index can be a permanent alteration, or alternatively, a temporary or reversible alteration. In this alternative, the refractive index preferably could be selectively modified as desired to achieve the desired delay in propagation.

Some examples of how this modification of refractive index can be achieved include, for waveguides in a silica substrate, exposing a portion of the waveguide to UV radiation. This will result in a permanent modification of the refractive index. Temporary or reversible modifications to the refractive index can be provided for waveguides in a silica substrate by providing selectively actuated heating elements adjacent the waveguide portion for which the refractive index changes are desired. For an embodiment of the invention using waveguides in an electro-optic substrate such as $LiNbO_3$, electrodes adjacent a waveguide may be used to provide a voltage across the waveguide, which will change the refractive index in a non-permanent fashion according to the well-known electro-optic effect.

In the illustrated embodiment, the tap waveguides are reflected back on themselves by, for example, a reflector 34 at the output end of the optical paths which make up tap waveguides 24, 26, 28 and 30, reflect the portions of the signal propagating down these optical paths back through the splitter tree 14 in the opposite direction. This ensures that the couplers, which separate the input signals into the successive stages of the splitter tree and the coupling of the delayed copies of the input signals, are accomplished in the same ratios. The reflector 34 can be a polished gold-plated surface or any other suitable reflective optical element or elements. The ports 40, 42 and 44 to the first, second and third couplers 18, 19 and 20, which do receive input power may be used to probe the couplers, for system monitoring.

Figure 2:
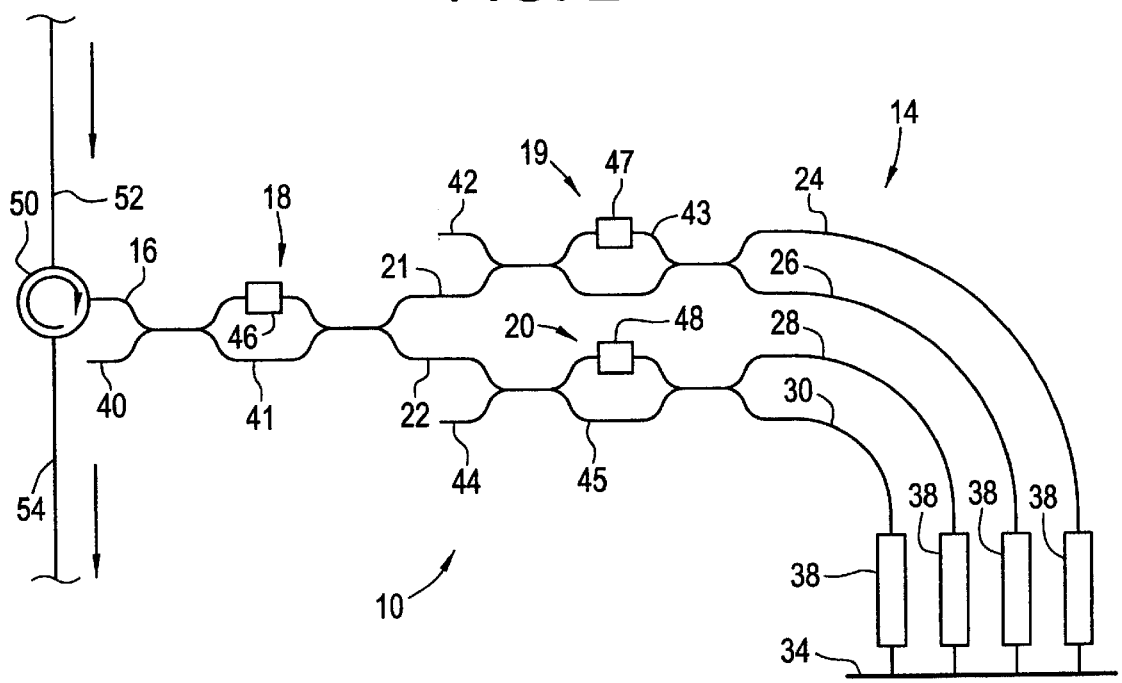
FIG. 2 is a schematic diagram of an alternate embodiment of the invention.

FIG. 2 shows an embodiment of the invention similar to that of FIG. 1, in which the first, second and third couplers 18, 19, 20 are illustrated as Mach-Zehnder interferometers 41, 43, 45, respectively. In an embodiment where the splitter tree 14 is fabricated with silica waveguides on a silicon substrate, the splitting ratios through these Mach-Zehnder elements 41, 43, 45 may be modified as desired by actuation of heating elements 46, 47, 48 adjacent the waveguide making up one arm of the Mach-Zehnder interferometer. In the embodiment of FIG. 2, a circulator 50 between the input waveguide 52 and the splitter tree 14 ensures that the reflected signal propagates to the output optical path 54. Those skilled in the art will appreciate that alternative means may be used to direct optical signals from a communication system into and out of the device 10, employing other optical components such as isolators, for example.

The embodiments of FIGS. 1 and 2 may be modified by replacing the reflector element 34 with a mirror image of the array. An example of this is illustrated in FIG. 3.

Figure 3:
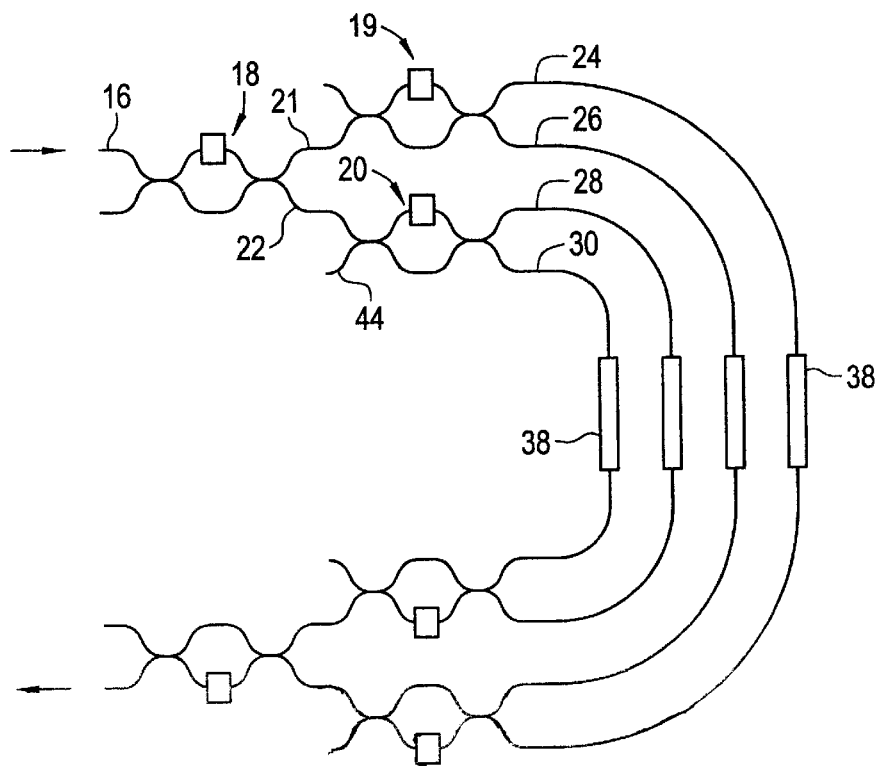
FIG. 3 is a schematic diagram of another alternate embodiment of the invention.
Figure 4:
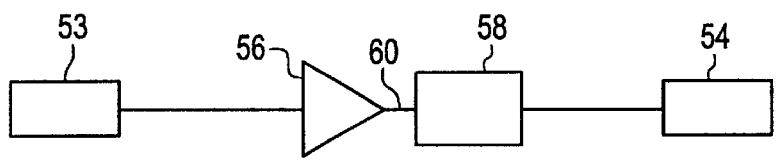
FIG. 4 is a schematic diagram of another alternate embodiment of the invention.

In another aspect of the invention, illustrated in FIG. 4, an optical communication system includes a transmitter 53, a receiver 54, an optical amplifier 56 which may be an erbium-doped fiber amplifier (EDFA), and a gain-flattening filter 58. The gain-flattening filter can be a spectral filter 10 as illustrated in FIGS. 1, 2 or 3. A waveguide 60 propagates a signal from the amplifier 56 to the gain flattening filter 58.

In this aspect, the splitting ratios and delays for the embodiment illustrated in FIGS. 1, 2 or 3 would preferably be chosen to provide a gain flattening effect to the output of the optical amplifier 58.

Figure 5:
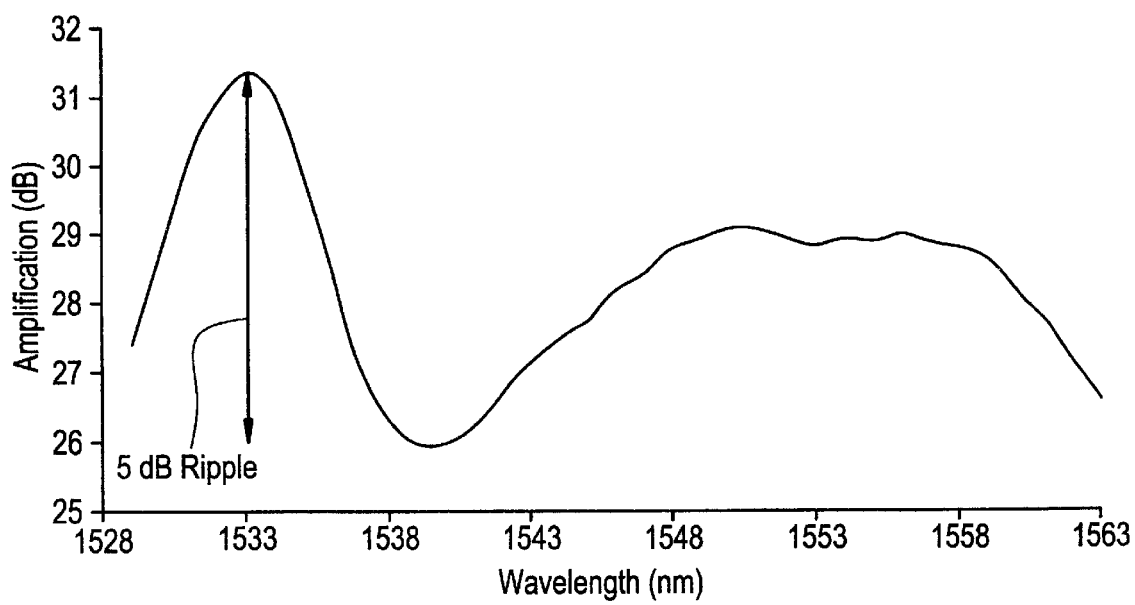
FIG. 5 is a graph showing a gain spectrum for an EDFA before gain flattening.

For example, suppose it is desired to realize a gain-flattening filter for an erbium-doped fiber amplifier (EDFA), operating over the C-band (roughly 1530–1560 nm), with 8 taps. In this particular example, the parameters will be chosen so that the device optimally flattens the gain of the amplifier at a population inversion level of 65%, the expected operating condition for a particular amplifier design. FIG. 5 shows the spectral gain profile for the amplifier at that inversion level. It is recognized that the spectral measurement is noisy, and the optimization should be robust enough to accommodate this limitation.

Calculation of the appropriate complex tap weights may be done using MathCAD software, and an annotated MathCAD script is given in Appendix—Part 1 to illustrate an example of appropriate steps taken in designing a device to realize such a function. Spectral scans at several inversion levels are recorded in the file, C-Band.txt, from which the design wavelengths (indicated by the vector k—Design) and gains (indicated by the matrices: y in dB units, A in absolute units) are extracted.

The Nyquist (sampling) theorem ordinarily dictates that the sampling interval T is chosen to correspond to the inverse of twice the frequency range of interest. In the present design example, this criterion would lead to the specification T=110 fsec. However, this should not be interpreted as a rigid constraint, and in fact a minimum least square error solution is actually obtained from 185 fsec. In fact, if the Nyquist theorem is followed blindly, there is also the very real possibility that a quite lossy system will result, since the range over which the desired response is specified is only half the free spectral range (in fact, it is this condition which insures that there is absolutely no aliasing), and over the other half may be where the transmission maximum occurs. This possibility follows from the constraint that a given tap weight cannot exceed unity. Thus, some searching for an optimal T must occur in general. For a given T however, optimization proceeds as follows.

The first step is to quickly arrive at a linear least mean-square (LMS) solution. This leads to a solution for the complex tap coefficients, which is obtained by representing the system transfer function as a weighted (by the tap coefficients) superposition of sinusoids in the frequency domain. Under such an optimization paradigm, the transfer function to be approximated must be specified both in amplitude and phase. Since the design task simply specifies the amplitude of the desired spectral response, the phase can be any arbitrary function. The phase functions $\Phi$ in Appendix—Part 1 were chosen based on a minimum-phase criterion. In the same way that the real and imaginary parts of the refractive index are related in dielectric materials, the principle of causality leads to this relationship between the amplitude and phase of a linear, causal system. Clearly, this is not the only phase relationship that can exist for a given amplitude of response, and in fact a non-linear optimization leads to a different function, as will be explained shortly. However, it is necessary to initiate the optimization at a reasonable starting point, and in this example, this function provides that initial guess.

Thus, with amplitude and phase determined, the target transfer function H is completely specified. The graphs of $\lambda\_design_k$ versus $|H_{k,3}|$ and $\Phi_{k,3}$ illustrate the amplitude and phase for this function, chosen for N=3, where the population inversion is 65%. In the present example, the number of taps, indicated by the constant, Taps, are 8. The complex cumulants are then computed for the LMS estimation of the complex tap weights, represented by the vector h, which is then normalized and presented graphically in the MathCAD script. From this, two frequency responses are derived: H2 and H3. H3 represents the response of an ideal tapped delay line system, for which h is not frequency dependent, while H2 represents the response for a system in which the phase is allowed to vary over the frequency range in a way consistent with approximating a desired phase by a constant delay over a narrow range of frequencies. The graphs of $\lambda\_Data_m$ verses $|H_{2\ m}|$ and $|H_{3\ m}|$ show the difference between the two functions. There is little difference between the functions, validating the assumption that for this narrow-band system, a constant delay is a good approximation to a constant phase. Over the frequency range of interest in the example, the RMS ripple in the compensated output is only 0.2 dB.

As mentioned above, the linear prediction may be used as a starting point for optimization for a given design. Once h is found in this way, a non-linear optimal solution may be found by entering the elements of h into the C program shown in Appendix—Part 2, which randomly perturbs the real and imaginary components of h in such a way as to minimize the RMS error in the gain-compensated ripple, after an appropriate number of trials and with simulated annealing.

Figure 6:
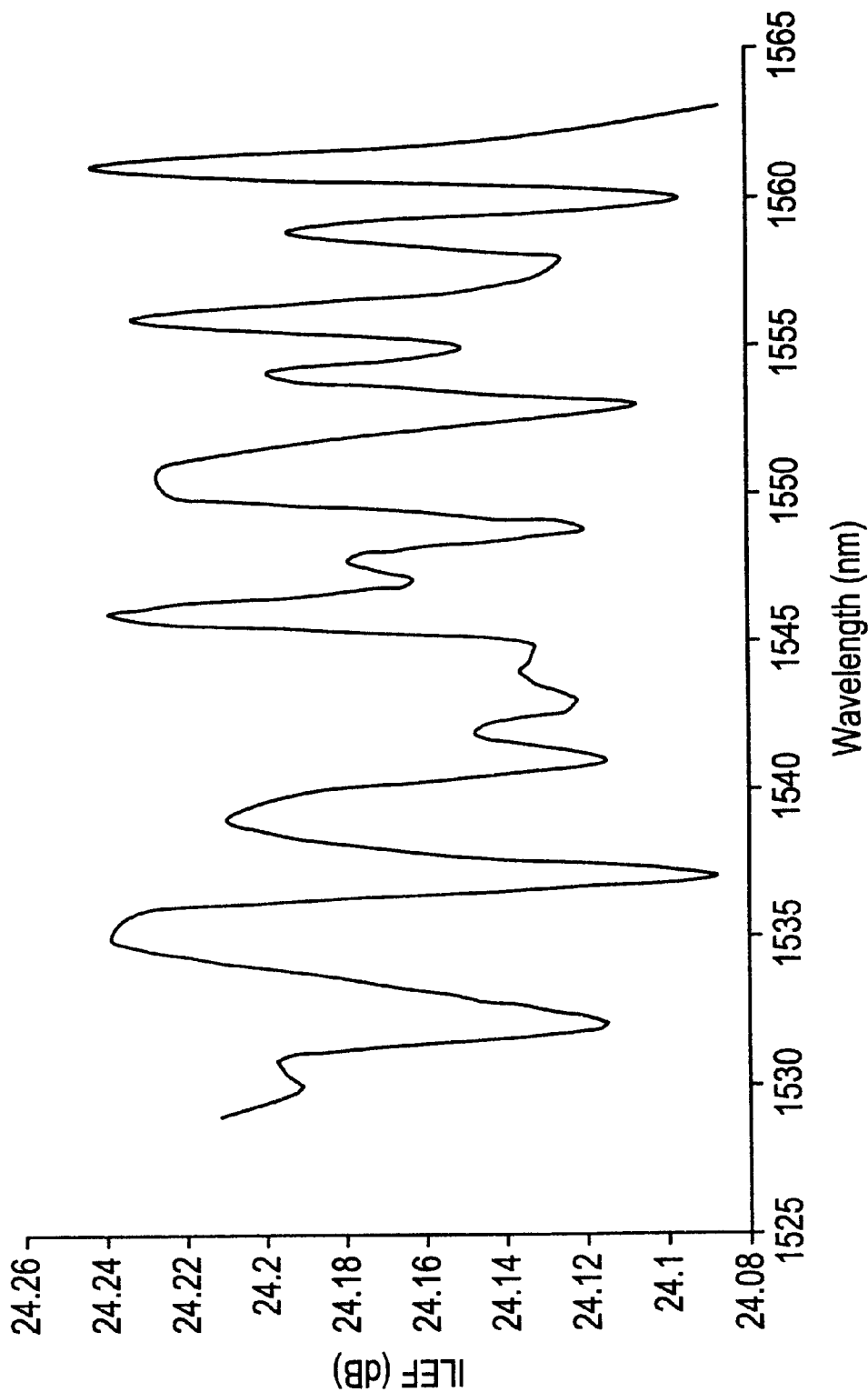
FIG. 6 is a graph showing a gain spectrum for an EDFA after gain flattening.

Following this non-linear optimization, the optimal impulse response coefficients (i.e. the elements of h), given in Appendix—Part 3, show that the RMS ripple has been reduced to a mere 0.047 dB. As can be seen in FIG. 6, this ripple is most likely due to random error in the data.

The In Situ Monitoring Device

Figure 7:
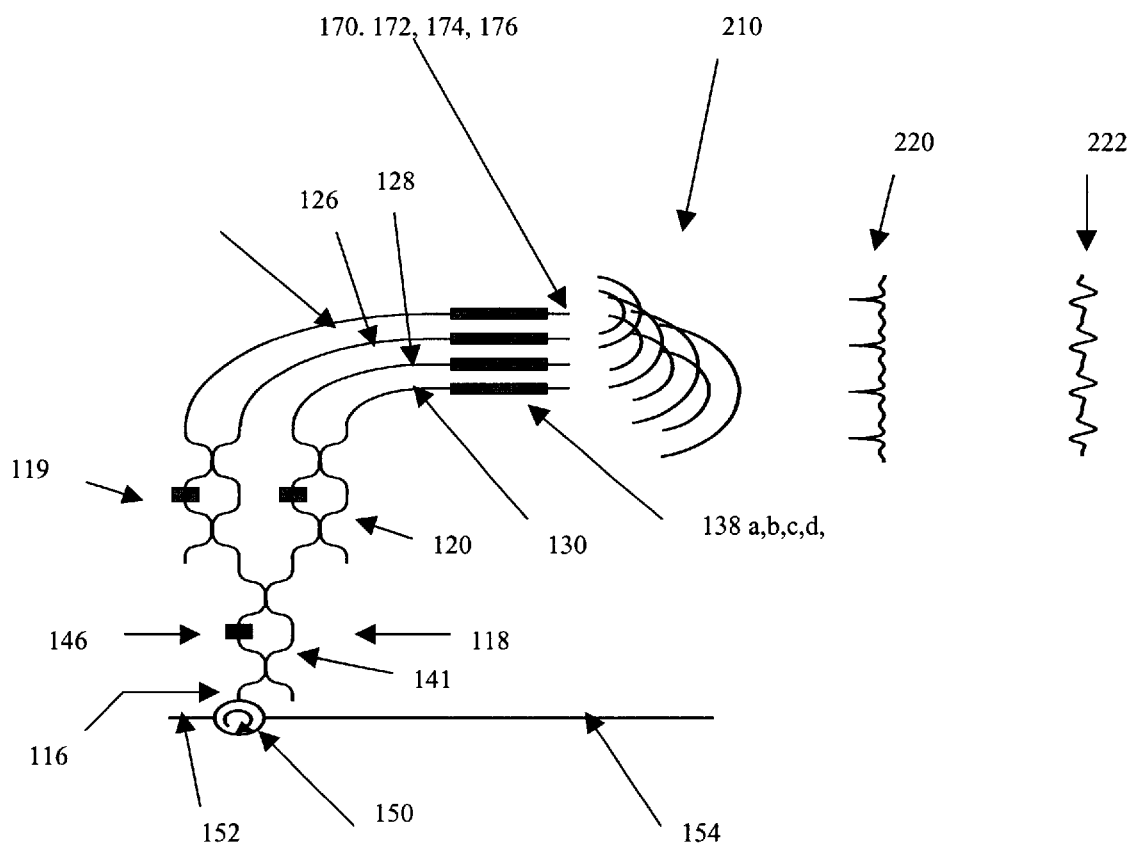
FIG. 7 is a schematic diagram illustrating an embodiment of the invention with an illustration of Fraunhofer diffraction patterns for 2 independent device states.

FIG. 7 illustrates the in situ monitoring device 110, with a further illustration of an exemplary interference pattern 210, and exemplary Fraunhofer diffraction patterns 220 and 222 for two independent device states. FIG. 7 is identical to FIG. 2 with the exceptions that in FIG. 7 the reflective mirror 34 of FIG. 2 is eliminated and waveguide ends 170, 172, 174 and 176 terminate in partially reflective mirrors made to allow partial transmission of the signal energy therein. Except for this partial transmission of signal energy to enable monitoring, the device of FIG. 7 works in exactly the same manner as that of FIG. 2. Elements 118, 119 and 120 in FIG. 7 are Mach-Zehnder interferometers analogous to those in FIG. 2 and have heating elements 146, 147 and 148, respectively, adjacent one arm of the waveguide making up one arm of the interferometer. These resistive heaters can be used to modify the splitting ratios through the Mach-Zehnder elements as has been described herein. Elements not numbered in FIG. 7 have the same function as those in FIG. 2 and would be numbered accordingly, but prefixed by a "1". For example, elements 47 in FIG. 2 would be numbered as 147 in FIG. 7.

The filtering element, as illustrated in FIG. 7, is a 4-tap, finite impulse response ("FIR") filter having a splitter tree 114 constructed using silica waveguides 124, 126, 128 and 130 on a silicon substrate as the taps. As described elsewhere herein, a portion of the waveguide includes the phase-shifting/delay elements 138 (four in FIG. 7 as a, b, c, and d), which in this case are resistively heated. Looking at FIG. 7, The properties of the waveguide portions on the right side of the delay elements, that is, those ending in reflective mirrors 170, 172, 174 and 176, are identical in properties the waveguide portions 124, 126, 128 and 130 located before (left side) the delay elements. The tap weights and phases are selected using refractive index perturbations induced by resistive heaters 138. The structure illustrated in FIG. 7 possesses a significant advantage in that the splitting and recombining stages are identical, thus ensuring maximum symmetry and hence ensuring the lowest signal power loss and highest dynamic range. In addition, since each signal path is used twice because the device is used in a reflective mode, the device requires only half the thermal power that would be required by a device operating in a non-reflective mode. The non-reflective mode would require twice the number of heaters since separate paths would be necessary for input and output signals.

The device of FIG. 7 can be used as an in situ probe of the device's instantaneous state. An input signal is supplied by via waveguide 152 to circulator 150 and thence to input line 116. The input signal then proceeds through a series of splitters (exemplified in FIG. 7 as Mach-Zehnder interferometers 117, 118 and 119), each of which has a resistance heater illustrated as 147, 148 and 149 on one arm thereof. After splitting and emergence from splitters 118 and 119, each of the four resulting signals travels along waveguides (taps) 124, 126, 128 and 130, through delay elements 138 and thence to waveguide ends 170, 172, 174 and 176, respectively. The waveguide ends reflective mirrors made to allow partial transmission of signal energy therein through the mirror to form diffraction pattern 210. A small amount of signal energy, typically in the range of 0.1% to 5% of the total power passing through each waveguide, is transmitted through the ends 170, 172, 174 and 176 to a monitor or detector (not illustrated) capable of receiving an optical signal and converting it into a display. By comparing the diffraction pattern to that predicted for the device, based on calibration data, one can use the information obtained as feedback to estimate and adjust the device parameters. The comparison is also capable of automation by the use of appropriate detectors and software. Adjustment of the device parameters is made by regulation of resistance heaters 147, 148 and 148, and changes in delay elements 138. The signal energy that is reflected by mirror ends 170, 172, 174 and 176 travels back along the same pathway to circulator 150 and thence along 154 as an output signal.

As stated, the device of FIG. 7 possesses an advantage over the other devices described herein because it can act as an in situ probe of the devices instantaneous state. The partial transmission of the signal energy in each tap from the ends of the waveguide (intersecting the mid-points of the signal paths) serve a tapped delay line diffractive array which can give rise to a diffraction pattern illustrated as 210. Each diffracting aperture (170, 172, 174 and 176) is radiating the same optical signal, amplitude and phase modulated, according to the desired temporal function of the device. The resulting instantaneous far-field (Fraunhofer) patterns illustrated as 220 and 222 for two different device states, represent a convolution of the input signal electric field with the transfer function resulting from an impulse response, the coefficients of which are the square root of the impulse coefficients for the filter, with the position along the Fraunhofer pattern being equal to the wavelength shift multiplied by the angular dispersion for the array. As suggested by FIG. 7, the average intensity pattern is expected to repeat with a spatial period equivalent to the devices free spectral range ("FSR"), multiplied by the angular dispersion, as described below.

The reflective device was assembled as illustrated in FIG. 7 and evaluated. The device had a sampling interval T (representing the delay between the successive taps) equal to 195 femtoseconds. This corresponds to an FSR of 5.1 THz or about 41 nm (nanometers). The spacing $\Lambda$ between the waveguide in the diffractive array of FIG. 7 is 300 microns (μm). Under a narrow-band, paraxial approximation, the corresponding angular dispersion D, corresponding to the spatial shift of the Fraunhofer pattern per frequency shift at a distance z from the diffractive array (that is, waveguide ends 170–178), is given by the equation $$D = zT(\lambda/\Lambda)$$

where the angular units are m/Hz. A value of z=~66 cm, estimated from the observed angular dispersion in the data, agrees well with the measured distance. This value results in D having a value of about 662 μm/THz at center wavelength 1550 nm (a wavelength used in optical communication devices).

The evaluation described herein did not make use of a Fourier transform lens which, is included, would be located to the right of waveguide end 170, 172, 174 and 176 in FIG. 7. As a result of not including this lens, the observed pattern for a diffracting object 900 μm wide (3Λ), at distance of 66 cm from the array, falls into the Fresnel regime and not the Fraunhofer. A consequence of not using the Fourier lens is that the diffraction pattern does not represent a simple convolution operation with the signal spectrum. However, despite this fact it is still possible to correlate the narrow-band impulse response coefficients for the filter state to the observed average intensity profile by using a least means square error ("LMSE") fit. Specifically, if $h_m$ corresponds to the complex amplitude of the m'th tap (that is, the value corresponding to the m'th impulse response coefficient), then the resulting intensity profile for a monochromatic input of wavelength λ, at a distance z from the array, would be proportional to $$I(x, \lambda) \propto \left| \sum_{m=0}^{3} \sqrt{h_m} \exp\left(-j\frac{2\pi}{\lambda}\left[c\frac{T}{2} - \frac{x\Lambda}{z}\right]m\right) \exp\left(j\frac{\pi}{\lambda z}[m\Lambda]^2\right) \right|^2$$

where j is the imaginary unit. The corresponding transmittance for the filter would then be $$\Gamma(\lambda) = \left| \sum_{m=0}^{3} h_m \exp\left(-j\frac{2\pi}{\lambda}cTm\right) \right|^2$$

As a result, by starting with reasonable estimates for the tap weights, one can refine those estimates by observing the average intensity profile in the diffraction pattern, and then perturbing the estimates to obtain the minimum LSME.

Figure 8:
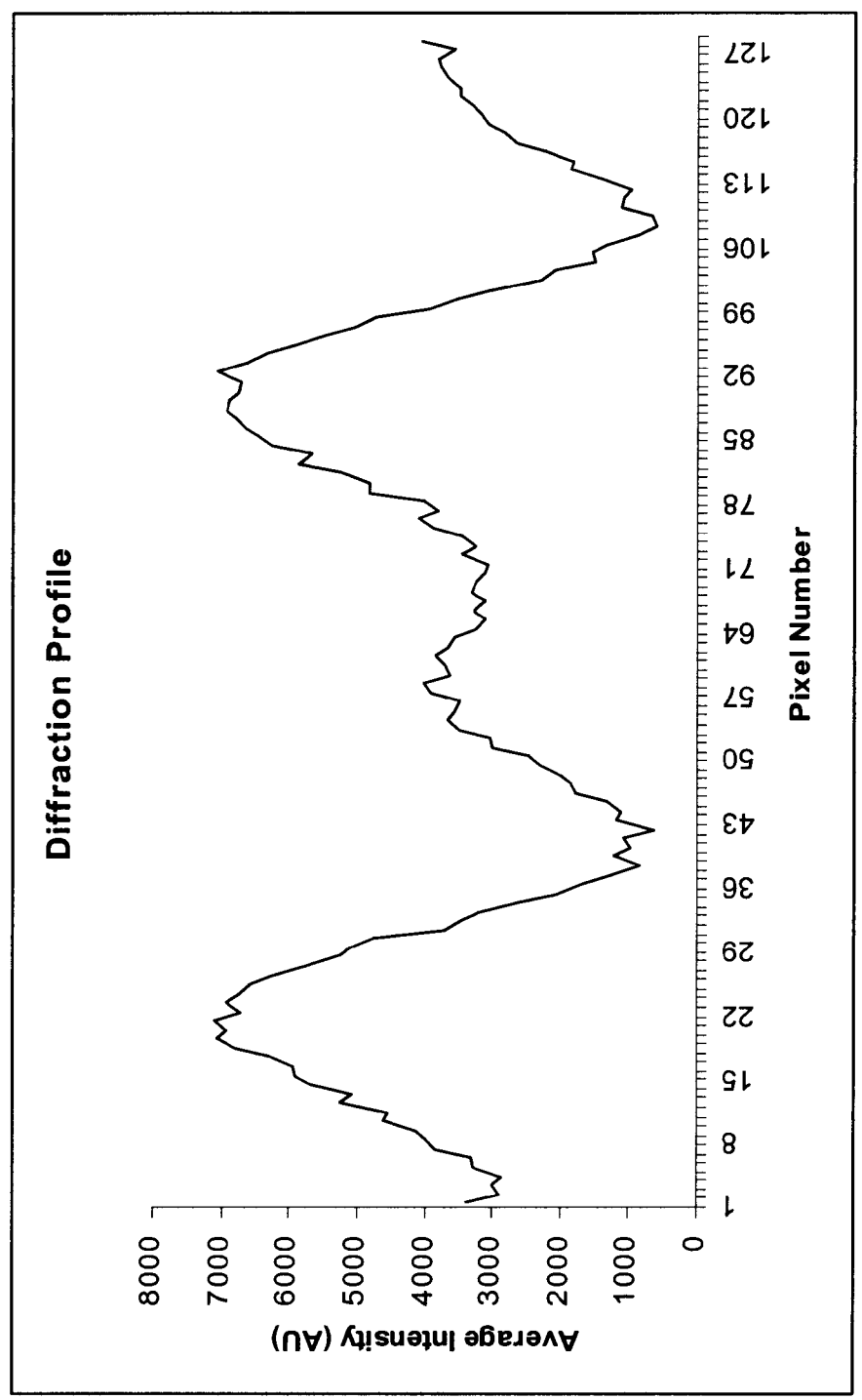
FIG. 8 is a graph depicting the detected intensity pattern in the Fresnel region of the diffractive array.
Figure 9:
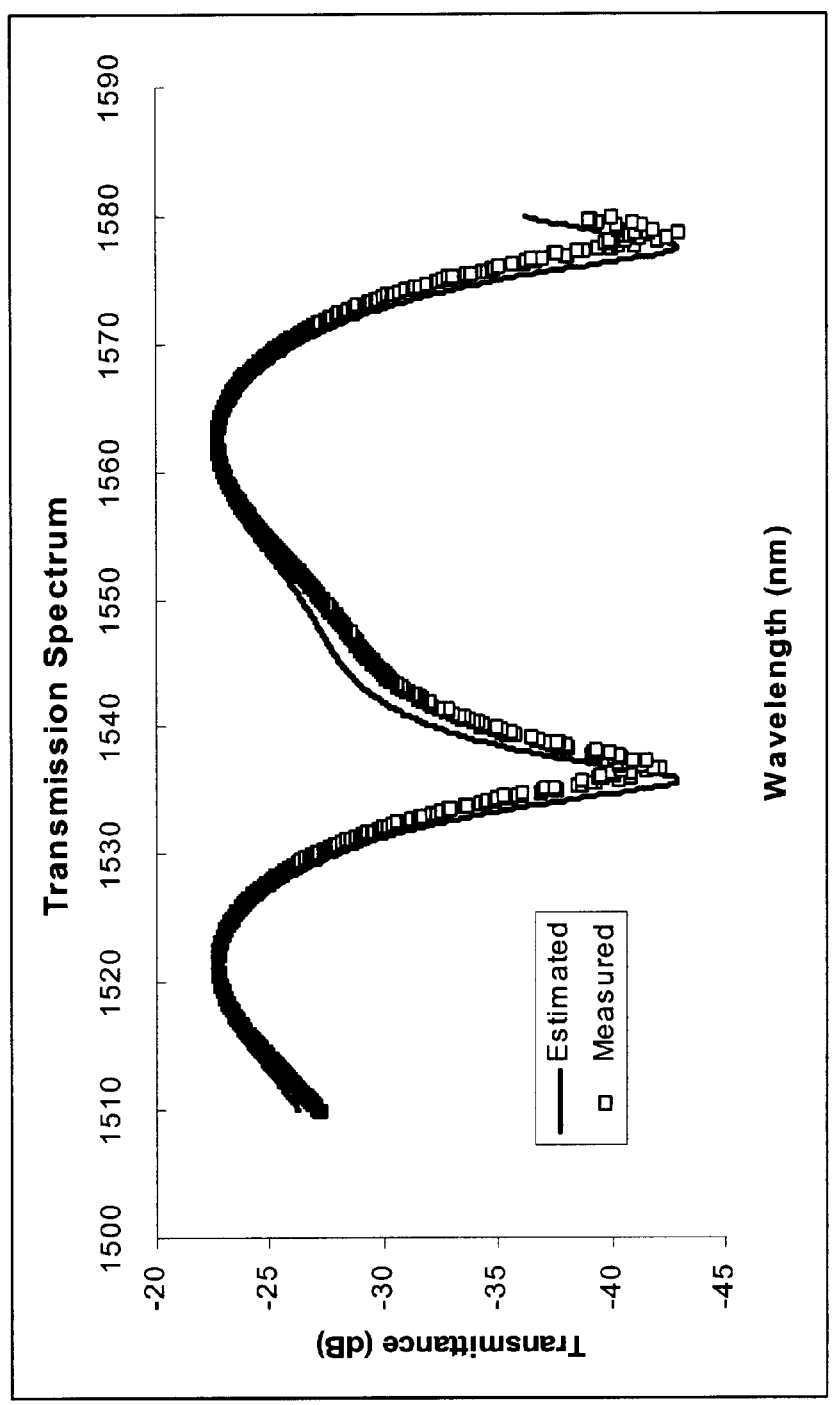
FIG. 9 is a graph comparing the estimated (boxes) and measured (line) transmission spectra corresponding to the refined device state.

For example, the pattern shown in FIG. 8 was detected for an approximately known device with a monochromatic input (in this case laser) at a wavelength of 1550 nm. Detection was done using 128 pixels of an InGaAs detector array in which the pixel spacing was 50 microns. As was expected, the pattern shown in FIG. 8 repeated and had a spatial period of approximately 68 pixels (approximately 3.4 mm). Perturbations to the tap amplitudes and phases were then applied, yielding the minimum LSME that yielded a refined estimate of the device state. The light source was then switched to a broad-band (ASE) source. The transmission spectrum illustrated in FIG. 9 was obtained and compared to the estimated spectrum. The RMS error in the spectral estimate was approximate 1.5 dB, an improvement of approximately 2.5 dB over the unrefined estimate. Because in these experiments the radiating facets were not reflection coated, this accounts for 14 dB of the overall insertion loss. An additional approximately 6.3 dB of insertion loss was attributed to the circulator and connector mismatches. These losses would be eliminated, or at least minimized, by appropriate matching.

The results indicate that the device of FIG. 7, used to observe the Fresnel pattern for a monochromatic probe input signal would yield an estimate of the device's transmission spectrum. Including a Fourier transform lens will insure efficient operation in the Fraunhofer regime. In addition, it would be possible to obtain a good estimate of the input spectrum, using another fixed tapped delay line array, which could be convolved numerically from the measured intensity profile. This operation would give a very precise estimate of the filter state without the need for using a spectrally pure probe source at used in the above example.

It will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

What is claimed is:

1. An apparatus for changing, and providing for in situ monitoring of, the spectral profile of an optical signal comprising:
    a plurality of optical paths, each of said optical paths having associated therewith a delay element which imparts a predetermined delay to a signal propagating through the optical path;
    an optical path leading from said delay element on a side opposite to the delay element input side, said path terminating in a partially reflective surface made such that a portion of the signal energy is allowed to pass through said partially reflective surface for detection by a detector and the remainder of the signal energy is reflected back upon itself and through said delay element;
    a plurality of couplers configured to split the optical signal among said plurality of optical paths according to predetermined splitting ratios; and
    wherein said predetermined delays and predetermined splitting ratios are chosen so as to effect the desired change to said spectral profile.

2. The apparatus of claim 1 wherein said predetermined delays and said predetermined splitting ratios are variable.

3. The apparatus of claim 2, wherein said waveguides comprise waveguides in electro-optic material and said delay elements include electrodes adjacent said waveguides.

4. The apparatus of claim 1 wherein said optical paths comprise waveguides and said delay elements include portions of said optical paths with an altered index of refraction.

5. The apparatus of claim 4, wherein said waveguides comprise silica waveguides and said delay elements include heating elements adjacent said waveguides.

6. The apparatus of claim 4 wherein said index of refraction is selectively reversibly alterable.

7. The apparatus of claim 4, wherein said optical paths comprise waveguides forming a splitter tree.

8. The apparatus of claim 1 further comprising an optical amplifier and an optical path between said optical amplifier and said coupler.

9. A gain flattening filter for use with an optical amplifier, and capable of in situ monitoring, comprising:
    an input waveguide;
        a plurality of tapped delay lines comprising waveguides and delay elements associated with said waveguides, each of said delay elements having associated therewith a waveguide whose proximal end is in contact with said delay element and whose distal end is a partially reflective surface made to allow transmission of a portion of the signal energy therein and reflect the remainder of said signal energy back upon itself;

a plurality of variable couplers configured to split an optical signal propagating on said input waveguide among said plurality of tapped delay lines according to predetermined splitting ratios;

wherein each of said delay elements is configurable to impart a predetermined delay to the signal propagating down the associated waveguide, wherein said predetermined delays are chosen so as to effect a flattening of the spectral profile of said optical signal.

10. The gain-flattening filter of claim 9 wherein said tapped delay lines comprise waveguides formed in a planar substrate.

11. The gain-flattening filter of claim 9 wherein said delay elements comprise selectively actuated resistive heating elements near said associated waveguides.

12. A monitorable optical communication system comprising:

an optical amplifier;

a spectral filter comprising an input waveguide;

a plurality of tapped delay lines, each of said tapped delay lines including a delay element on said line; each of said delay elements having associated therewith a waveguide whose proximal end is in contact with said delay element and whose distal end is a partially reflective surface made to allow transmission of a portion of the signal energy therein and reflect the remainder of said signal energy back upon itself, a plurality of couplers configured to split an optical signal propagating on said input waveguide among said plurality of tapped delay lines according to predetermined splitting ratios;

wherein said delay elements are configurable to impart a predetermined delay to the signal propagating down said line, wherein said predetermined delays are chosen so as to effect the desired change to said spectral profile, and wherein said portion of said signal passing through said reflective surface is monitored by a monitor; and an optical path between said amplifier and said filter.

13. A method for modifying the spectral distribution of an optical signal comprising the steps of:

splitting the signal among a plurality of optical paths, each having an end, whereby a portion of the signal propagates on each of the optical paths, and said end terminates in a partially reflective surface made to allow transmission of a portion of the signal energy therein and reflect the remainder of said signal energy back upon itself;

changing the relative phases of the portions of the signal propagating through the optical paths;

modifying the amplitudes of the portions of the signal propagating through the optical paths;

the relative phase changes and the amplitude modifications having magnitudes which result in a desired spectral distribution when the portions of the signal at the output ends of the optical paths are combined; and combining the portions of the signal at the output ends of the optical paths.

14. The method of claim 13 wherein the step of changing the relative phases comprises delaying the propagation of the portion of the signal in at least one of the optical paths by an amount different from the others of said optical paths.

15. The method of claim 14 wherein the amplitude modifying step comprises applying weighting coefficients to the portions of the signal propagating through the optical paths.

16. The method of claim 15 wherein the delaying step further comprises modifying the refractive indices of each of said plurality of the optical paths.

17. The method of claim 16 further comprising the steps of:

determining the magnitude of each of said delays necessary to result in the desired spectral distribution; and modifying the refractive index of each of the optical paths by an amount which results in the determined delay magnitude.

\* \* \* \* \*